(12) United States Patent
Mestery et al.

(10) Patent No.: US 12,069,103 B2
(45) Date of Patent: Aug. 20, 2024

(54) IMPLEMENTING POLICY BASED ON UNIQUE ADDRESSES OR PORTS

(71) Applicant: Cisco Technology, Inc., San Jose, CA (US)

(72) Inventors: Kyle Andrew Donald Mestery, Woodbury, MN (US); Vincent E. Parla, North Hampton, NH (US)

(73) Assignee: Cisco Technology, Inc., San Jose, CA (US)

( * ) Notice: Subject to any disclaimer, the term of this patent is extended or adjusted under 35 U.S.C. 154(b) by 232 days.

(21) Appl. No.: 17/678,560

(22) Filed: Feb. 23, 2022

(65) Prior Publication Data
US 2023/0269275 A1    Aug. 24, 2023

(51) Int. Cl.
*H04L 9/40* (2022.01)

(52) U.S. Cl.
CPC ........ *H04L 63/205* (2013.01); *H04L 63/0254* (2013.01); *H04L 63/0272* (2013.01)

(58) Field of Classification Search
CPC .............. H04L 63/205; H04L 63/0254; H04L 63/0272
See application file for complete search history.

(56) References Cited

U.S. PATENT DOCUMENTS

| | | |
|---|---|---|
| 6,493,765 B1 | 12/2002 | Cunningham et al. |
| 6,892,245 B1 | 5/2005 | Crump et al. |
| 7,116,681 B1 | 10/2006 | Hovell et al. |
| 7,792,994 B1 | 9/2010 | Hernacki |
| 8,199,752 B2 | 6/2012 | Swanson et al. |
| 8,775,564 B1 | 7/2014 | Smart et al. |
| 10,560,480 B1 | 2/2020 | Sirigiri |
| 10,609,081 B1 | 3/2020 | Appala et al. |
| 11,100,197 B1 | 8/2021 | Bernardi |
| 2005/0273850 A1 | 12/2005 | Freund |
| 2007/0160200 A1 | 7/2007 | Ishikawa |
| 2010/0138910 A1 | 6/2010 | Aldor |

(Continued)

FOREIGN PATENT DOCUMENTS

WO    WO2021009553 A1    1/2021

OTHER PUBLICATIONS

Office Action for U.S. Appl. No. 17/678,472, mailed on Oct. 2, 2023, Mestery, "Binding Flows to Unique Addresses or Ports", 26 Pages.

(Continued)

*Primary Examiner* — Brian F Shaw
(74) *Attorney, Agent, or Firm* — Lee & Hayes, P.C.

(57) ABSTRACT

Techniques for binding communication flows to unique addresses and/or ports, and configuring networking devices internal to a network to apply policy without the need to further introspect a given stream. Further, by creating mappings of unique addresses and/or ports to flows, the network devices are able to enforce policy without needing to coordinate with an edge node of the network at which the communication session terminates. Further, the techniques may include providing an SDN controller with a mapping between a unique address/port and a network flow, determining flow-specific policy to enforce on the flow, and programming one or more network devices to enforce the flow-specific policy in the network using the unique address/port.

14 Claims, 10 Drawing Sheets

(56) References Cited

U.S. PATENT DOCUMENTS

| | | |
|---|---|---|
| 2014/0355542 A1 | 12/2014 | Zhang |
| 2015/0269238 A1* | 9/2015 | Song .................. H04L 67/1095 |
| | | 710/6 |
| 2016/0119226 A1* | 4/2016 | Guichard ................ H04L 45/00 |
| | | 370/392 |
| 2017/0208033 A1 | 7/2017 | Roskind et al. |
| 2018/0062995 A1 | 3/2018 | Naar |
| 2018/0123958 A1 | 5/2018 | Ignatchenko |
| 2018/0198838 A1 | 7/2018 | Murgia |
| 2019/0068494 A1 | 2/2019 | Tamizkar |
| 2019/0253385 A1 | 8/2019 | Gurney |
| 2019/0297161 A1 | 9/2019 | Ayyadevara et al. |
| 2020/0067824 A1 | 2/2020 | Shelar et al. |
| 2020/0120015 A1 | 4/2020 | Boucadair et al. |
| 2020/0120555 A1 | 4/2020 | Patil et al. |
| 2020/0280584 A1 | 9/2020 | Zhao |
| 2021/0099482 A1 | 4/2021 | Doron et al. |
| 2021/0135990 A1 | 5/2021 | Ignatchenko |
| 2023/0216947 A1 | 7/2023 | Bernardi |
| 2023/0269217 A1 | 8/2023 | Mestery |
| 2023/0388786 A1 | 11/2023 | Ihlar |

OTHER PUBLICATIONS

Office Action for U.S. Appl. No. 17/678,472, mailed on Mar. 19, 2024, Mestery et al., "Binding Flows To Unique Addresses or Ports", 26 pages.

* cited by examiner

900 ⭢

```
┌─────────────────────────────────────────────────────────────────┐
│ RECEIVE, AT A SOFTWARE-DEFINED NETWORKING (SDN) CONTROLLER OF A │
│ NETWORK, AN INDICATION OF A MAPPING BETWEEN A UNIQUE DESTINATION│
│ PORT NUMBER ASSOCIATED WITH A NETWORK FLOW AND CONTEXT DATA     │
│ ASSOCIATED WITH THE NETWORK FLOW, WHEREIN THE UNIQUE DESTINATION│
│ PORT NUMBER MAPS TO AN ACTUAL PORT NUMBER OF A DESTINATION      │
│ DEVICE IN THE NETWORK                                           │
│                              902                                │
└─────────────────────────────────────────────────────────────────┘
                                 │
                                 ▼
┌─────────────────────────────────────────────────────────────────┐
│ IDENTIFY NETWORK POLICY TO APPLY TO THE NETWORK FLOW BASED AT   │
│ LEAST IN PART ON THE CONTEXT DATA                               │
│                              904                                │
└─────────────────────────────────────────────────────────────────┘
                                 │
                                 ▼
┌─────────────────────────────────────────────────────────────────┐
│ SEND, FROM THE SDN CONTROLLER, AN INSTRUCTION TO A NETWORK      │
│ DEVICE IN THE NETWORK TO ENFORCE THE NETWORK POLICY ON THE      │
│ NETWORK FLOW HAVING THE UNIQUE DESTINATION PORT NUMBER          │
│                              906                                │
└─────────────────────────────────────────────────────────────────┘
```

FIG. 9

IMPLEMENTING POLICY BASED ON UNIQUE ADDRESSES OR PORTS

TECHNICAL FIELD

The present disclosure relates generally to binding communication flows to unique addresses or ports to enable network devices to enforce flow-specific policy on the communication flows.

BACKGROUND

Computing devices utilize computer networks in order to communicate data with each other. Often, the computer networks are public networks, such as the Internet, that can be monitored by malicious third parties. In order to prevent malicious third parties from monitoring communication data, computing devices often encrypt the communication data as it travels between devices. It is generally more advantageous to have the communication data encrypted at the source device and decrypted as close to the destination device as possible to ensure that the communication data is only viewed by the source and destination devices that have agreed to communicate. However, encrypting traffic can prevent network devices from inspecting payloads and applying network policy. Thus, encryption protocols can make it difficult for security devices to apply network policy. Although security devices can be configured to decrypt the communication flows for inspection, this generally requires additional orchestration as well as significant compute resources and time.

As an example, enterprises often provide their users (e.g., employees, customers, etc.) with methods of remotely accessing services, such as by a traditional virtual private network (VPN), reverse/forward proxy techniques, or the like. While the tunnels generally terminate at the edge of the destination network, the internal network traffic is also typically encrypted as it moves through the network towards the destination application or service. While having internal traffic encrypted helps ensure privacy using encryption techniques, this limits what network enforcement points can do in terms of enforcing policies on that traffic without coordinating with the VPN termination or reverse proxy node to garner additional context about the flows. Additionally, protocols such as Hypertext Transfer Protocol 2(HTTP/2), HTTP/3, Quick UDP Internet Connection (QUIC), Multiplexed Application Substrate over QUIC Encryption (MASQUE), as well as traditional VPNs, all support a notion of multiplexing traffic into single streams.

Thus, when these types of connections traverse the network, they may actually contain multiple flows internally inside the single encrypted stream. However, the network may see the multiple flows as a single encrypted stream. Accordingly, it may be difficult for networks to apply network policy on a per-flow basis without coordinating with the VPN termination or reverse proxy node.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 9 illustrates a flow diagram of an example method for an SDN controller to program an enforcement network device in a network to apply policy to a network flow having a unique destination port number.

DESCRIPTION OF EXAMPLE EMBODIMENTS

Overview

Figure 1:
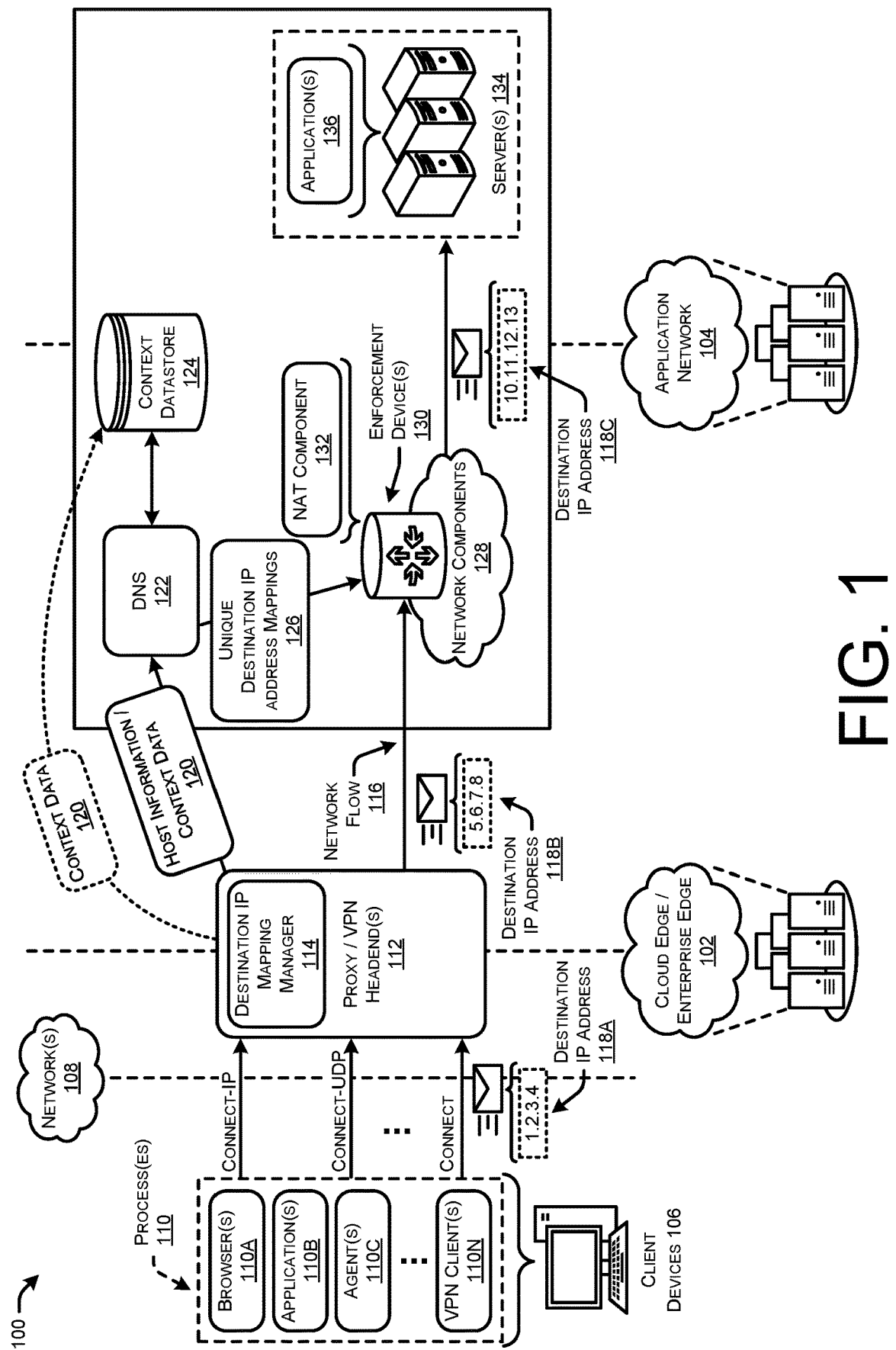
FIG. 1 illustrates a system-architecture diagram in which a unique destination IP address is mapped to a network flow such that an enforcement device in a network can apply policy without having to introspect the network flow.

This disclosure describes techniques for binding communication flows to unique addresses or ports, and programming network devices to enforce flow-specific policy on the communication flows.

The techniques described herein may include a first method that includes receiving, at a Domain Name System (DNS) and from a termination device, a DNS request to resolve a domain name on behalf of a source device into a destination Internet Protocol (IP) address associated with a destination device in a network. The first method may further include receiving, from the termination device, context data associated with a network flow sent from the source device and destined for the destination device. Additionally, the first method may include generating, by the DNS, a unique destination IP address that corresponds to the destination IP address of the destination device, and storing a mapping between the unique destination IP address and at least one of (i) the context data or (ii) network policy determined using the context data. Further, the first method may include sending the unique destination IP address from the DNS and to the termination device. Finally, the first method may include detecting the network flow in the network, wherein the network flow has the unique destination IP address in a destination address field, and applying the network policy to the network flow based at least in part on the mapping.

The techniques described herein may additionally, or alternatively, include a second method that comprises receiving, at a software-defined networking (SDN) controller of a network, an indication of a mapping between a unique destination Internet Protocol (IP) address associated with a network flow and context data associated with the network flow. In some instances, the unique destination IP address maps to an actual IP address of a destination device in the network. Additionally, the second method may include identifying network policy to apply to the network flow based at least in part on the context data, and sending, from the SDN controller, an instruction to a network device in the network to enforce the network policy on the network flow having the unique destination IP address.

In some instances, the first method and/or second method may additionally, or alternatively, perform the techniques using one or more of a unique source IP address, a unique destination port number, and/or a unique destination source number.

Additionally, the techniques described herein may be performed by a system and/or device having non-transitory computer-readable media storing computer-executable instructions that, when executed by one or more processors, performs the method described above.

Example Embodiments

This disclosure describes techniques for binding communication flows to unique addresses and/or ports, and configuring networking devices internal to a network to apply policy without the need to further introspect a given stream. Further, by creating mappings of unique addresses and/or ports to flows, the network devices are able to enforce policy without needing to coordinate with an edge node of the network at which the communication session terminates or is tunneled. Further, the techniques may include providing an SDN controller with a mapping between a unique address/port and a network flow, determining flow-specific policy to enforce on the flow, and programming one or more network devices to enforce the flow-specific policy in the network using the unique address/port.

Client devices (or any type of source device) run various software programs that can communicate data in encrypted flows using various encryption protocols. For instance, the client devices can be running applications, software agents, web browsers, VPN clients, and the like, that can communicate data using encrypted flows. Additionally, many of these software programs use protocols such as HTTP/2, HTTP/3, QUIC, MASQUE, VPN connections, and so forth, that allow for multiplexing of traffic into single encrypted streams. The client device can communicate data in one or more network flows, encrypted in a single stream, over one or more networks (e.g., campus networks, Internet, etc.) and towards a termination device. Depending on the protocol being used, the termination device may be a device located on the edge of a network associated with the destination device, such as the edge of a cloud network, enterprise network, etc. For instance, the edge device may be a VPN headend associated with an enterprise network that is hosting an application or service the client device is attempting to contact. As another example, the termination device may be a reverse/forward proxy device located on the edge of a cloud network, enterprise network, etc., at which the encrypted stream is terminated. As noted above, the network flows may traverse the network (e.g., enterprise network, cloud network, etc.) as a single encrypted stream, for example via the QUIC multiplexing protocol functionality. However, there may be different network flows inside the stream that may need different network policy applied thereon.

According to the techniques described herein, the termination device (e.g., reverse/forward proxy, VPN headend, etc.) may be configured to terminate the inner (higher-level) protocols used to communicate the single encrypted stream (e.g., HTTP/1, HTTP/2, HTTP/3, QUIC, etc.), separate any multiplexed streams inside of the protocol into unique streams, and perform DNS queries on each stream. In some instances, the termination device may further identify and/or extract additional information for each unique stream, such as a Host header for each unique stream and potentially additional metadata/context data. The Host header generally specifies the host and port number, and potentially other context data as well. Additionally, the HTTP connect family (e.g., Connect-IP, Connect-UDP, etc.) support basic and HyperText Markup Language (HTML) authentication. Similarly, the MASQUE protocol has an authentication mechanism built in that the proxy headend can use to determine the identity of the user. In this way, the proxy headend may determine who the user is using the authentication protocol. Thus, additional context data such as user data, device information, and/or any other context data that may be helpful for policy enforcement may be extracted from the unique streams or from the outer protocol (e.g., VPN or reverse proxy termination). The Host header and context data for each unique stream may be sent to the DNS system in and/or with a DNS query.

Traditionally, the DNS system may receive the DNS queries for each unique stream from the termination device, and simply resolve the domain name and return the intended destination IP address for each unique stream to the termination device. However, in some instances the DNS system may be configured to generate unique destination IP addresses for each stream that map to the intended/actual destination IP address of the destination device. The DNS system may store mappings between the unique destination IP addresses and the actual destination IP addresses, and then return the unique destination IP addresses to the termination device in a DNS response. Further, the context data may be received by the DNS system, and the DNS system may additionally store a mapping between the unique destination IP address and the associated context data. The context data may be utilized to apply policy by the enforcement network device(s) in the network.

The termination device that is on the edge of the network may then insert the unique IP destination addresses into destination fields of the appropriate streams or flows. The termination device may then send each of the unique streams through the network, and the unique streams may have destination fields populated with the respective unique destination IP addresses. That is, the proxy/VPN headend may use the uniquely-assigned-destination-IP-address to establish a connection to the intended destination (note that originally multiplex streams are turned into multiple unicast streams with a uniquely-assigned-destination-port per stream).

The DNS system may distribute context data to the network device(s) that are enforcing the policies. The context data may contain mappings between the uniquely-assigned-destination-IP-addresses and the intended original-destination-IP-addresses, and may further include indications of how to apply policy to the specific uniquely-assigned-destination-IP-addresses. In some instances, the policies can be crafted such that the enforcement network device do not need to do a lookup on every IP address. For example, IP addresses can be assigned from a range of given destination IP addresses that have a defined meaning/mapping. For example, any destination IP address assigned in a particular destination IP address range could mean 'member of finance group.' From this, an enforcement network device can know, a priori, that any traffic destined for a destination IP address range is from a 'finance' user and apply micro-segmentation or other policies to the traffic associated with a 'finance' user.

Generally, a network device near the final destination device may serve as a Network Address Translation (NAT) device. In some instances, the enforcement device may be the NAT device that maps the unique-destination-IP-address back to the original destination-IP-address. It may be advantageous to have the NAT device located close to the destination device in the network so that the packets in between have the NAT-treated values to allow policy enforcement to occur on packets in the network between the source and destination.

In some examples, rather than using unique-destination-IP-addresses that map to intended or actual destination IP addresses, the techniques may be performed using one or more of unique-source-IP-addresses, unique-destination-port-numbers, and/or unique-source-port-numbers. That is, the DNS system may instead generate unique source IP addresses, unique source port numbers, and/or unique destination port numbers that map back to actual values. These unique addresses/port numbers can similarly be mapped to unique flows/connections as described above. As described herein, the techniques for assigning unique ports (e.g., unique source ports, unique destination ports, etc.) may not be performed by the DNS system, but may be performed via a DNS extension or an external policy system separate from the DNS system.

In some instances, the enforcement network devices may perform a lookup to identify user information and information about the application (or other destination) that the client device is attempting to reach. The DNS may then provide context data, or simply provide enforcement instructions, to the enforcement devices in order to enforce the policy. In some instances, the DNS does not provide any instructions, and the enforcement network nodes may apply policy that has been programmed thereon for different IP address and/or port number ranges or values.

Thus, the enforcement network devices may receive the context data that includes the mappings and other context data and may enforce policy based on that information. In other instances, the enforcement network devices may perform a DNS lookup to determine the actual/intended destination, and may receive context data and/or enforcement instructions at that point. In other examples, the DNS does not provide any instructions, and the enforcement network nodes may apply policy that has been programmed thereon for different IP address and/or port number ranges or values.

However, in some examples, the enforcement device(s) may be programmed to implement policy by an SDN controller of the network. Generally, once the SDN controller is aware of the user via either destination IP/port or source IP/port, then the SDN controller may apply policies as defined by an administrator at various placed in the network. For example, the SDN controller may program Access Control Lists (ACLs) on switches or smart network interface cards (smartNICs), re-route traffic to intrusion detection (IDS) systems or intrusion prevention (IPS) systems, blocking connections, isolating traffic into a specific virtual overlay network, and so forth.

Generally, the SDN controller receives mappings between user IDs and network flows from the DNS layer (e.g., destination/source IP addresses, destination/source port numbers, etc.) as described herein. For instance, at the point of assigning a unique address/port number, the DNS will notify the SDN controller about the flow-to-address/port mapping. The SDN controller may determine policy for the flow, such as based on the user ID associated with the flow, the application to which the flow is destined, etc. The SDN controller may notify or send instructions to one or more enforcement nodes regarding how to enforce the policy for flows that have the unique address/port. The client device then sends data in a flow that is destined to the unique address/port, and the network flow will go through an enforcement node, which may also be configured to perform NAT and/or Port to Address Translation (PAT). The enforcement node will then detect the unique address/port of the flow, and enforce the policy for that flow. Additionally, the enforcement node may also perform NAT/PAT on the flow and send the network flow towards the next hop in the network (if allowed by the policy). The enforcement node may be programmed to implement various policy actions, such as sending the network flow through an inspection node, redirecting the network flow to a different data center, sending the traffic through a stateful firewall, dropping the network flow, allowing the network flow to pass, and so forth. In this way, the SDN controller may program policy into one or more enforcement nodes in a network.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram 100 in which a unique destination IP address is mapped to a network flow such that an enforcement device in a network can apply policy without having to introspect the network flow.

As illustrated, the system-architecture diagram 100 includes a cloud edge/enterprise edge 102 (also referred to herein as "edge 102") at which flows are terminated that are destined for an application or service hosted in an application network 104. Generally, the flows that are terminated at the edge 102 are initiated at source devices, such as client devices 106. The edge 102 may include one or more devices that act as headend devices, such as a reverse/forward proxy headend 112, a VPN headend 112, and/or any other type of headend 112 on which flows are terminated.

The client devices 106 may be any type of computing device configured to communicate as described herein using various communication protocols. For instance, the client devices 106 may be personal user devices (e.g., desktop computers, laptop computers, phones, tablets, wearable devices, entertainment devices such as televisions, etc.), network devices (e.g., servers, routers, switches, access points, etc.), and/or any other type of computing devices. The edge 102 may have one or more edge devices at which flows terminate, such as one or more reverse/forward proxy headends 112, one or more VPN headends 112, and/or any other type of headend device/component 112. The headends 112 may be physical devices, and/or virtualization processes running on physical devices (e.g., functions, virtual machines, containers, etc.). The application network 104 may include or be associated with the headend 112. For instance, the headend 112 may terminate flows from client devices 106 that are being sent to applications of the application network 104.

As shown, the client devices 106 may include or run one or more processes 110, such as browsers 110A, applications 110B, agents 110C, VPN clients 110N, and so forth that are able to establish connections/flows between the client devices 106 and the headends 112. For instance, the processes 110 may initiate connections or flows to backend applications or services that are hosted in the application network.

The processes 110 running on the client devices 106 may initiate or communicate using various techniques and protocols, such as HTTP/2, HTTP/3, QUIC, MASQUE, and so forth. In some instances, the processes 110 may use techniques to proxy over HTTP, such as by using Connect to proxy TCP over HTTP, Connect-UDP to proxy UDP over HTTP, and so forth. However, HTTP/2, HTTP/3, QUIC, MASQUE, VPNs, and other protocols support the notion of multiplexing traffic into a single stream. Thus, when the single streams from the client devices 106 traverse networks (e.g., application network 104), they may in fact contain multiple flows internals inside the single encrypted stream. While network devices and components within the application network 104 see a single stream for one of these protocols, it may in fact be several streams in reality.

Accordingly, the headends 112 (or termination devices) may be configured to terminate the inner (higher-level) protocols used to communicate the single encrypted stream (e.g., QUIC, HTTP/2, HTTP/3), separate any multiplexed streams inside of the protocol into unique streams, and perform DNS queries on each stream by sending DNS queries to a DNS system 122 associated with the application network 104. In some instances, the headends 112 may further identify and/or extract additional information for each unique stream, such as a Host header for each unique stream and potentially additional metadata/context data. The Host header generally specifies the host and port number, and potentially other context data as well. Additionally, the HTTP connect family (e.g., Connect-IP, Connect-UDP, etc.) support basic and HyperText Markup Language (HTML) authentication. Similarly, the MASQUE protocol has an authentication mechanism built in that the proxy headend can use to determine the identity of the user. In this way, the headends 112 may determine who the users of the client devices 106 are using the authentication protocol. Thus, additional context data such as user data, device information, and/or any other context data that may be helpful for policy enforcement may be extracted from the unique streams. The Host header (or header data 120) and context data 120 for each unique stream may be sent to the DNS system 122 in and/or with a DNS query.

The DNS system 112 may receive the DNS query that includes the host information/context data 120 and determine, from the DNS query, the domain name for an application or service to which the traffic/flow is being sent from the client device 106. In some instances, the DNS system 112 may receive multiple DNS queries, or one DNS query for each stream if originally multiplexed, and the DNS system 112 receives a query (and potentially header/context data) for each stream. The DNS system 112 may then perform a lookup for each domain name in each query to determine a destination IP address for the domain name. However, rather than simply returning the actual/intended destination IP address (and destination port number in some instances), the DNS system 122 may instead generate or create a unique destination IP address and store a mapping between each flow and each unique destination IP address, also store a contextual mapping of IP address to the context data 120 collected for each flow in a context datastore 124.

The DNS system 122 may then return, to the headend 112, the uniquely-assigned-destination-IP-address for each stream. The headend 112 then uses each uniquely-assigned-destination-IP-address to establish a connection, and the originally multiplex streams are turned into multiple unicast streams with a uniquely-assigned-destination-IP-address per stream). Further, the DNS system 122 may determine, receive, craft, or otherwise obtain policies that are applied on a per-flow (e.g., per-application, per-user, etc.) basis.

The application network 104 may include one or more network components 128 that are configured to perform various networking operations, such as dropping packets, forwarding traffic, routing traffic, duplicating traffic, performing NAT/PAT, and so forth. For instance, the network components 128 may include NAT boxes, PAT boxes, routers, switches, smartNICs, virtual switches, and so forth. In some instances, the network components 128 may include one or more enforcement devices 130 that are used to enforce policy on a flow-by-flow basis based on the uniquely assigned destination IP addresses. The network components 128 may comprise any type of hardware device, software component, and/or combination thereof for enforcing policy in a network and/or handling traffic.

The DNS system 122 may provide unique destination IP address mappings 126 to the enforcement device(s) 130, and may further provide the policies, or instructions for enforcing the policies. In some instances, the enforcement device(s) 130 may receive a flow, and do a reverse DNS lookup to determine the network policy that is to be applied to the flow based on the unique destination IP address. In some examples, the policies may be crafted such that the enforcement device(s) 130 do not need to do a lookup on every unique destination IP address. For example, a unique destination IP address can be assigned from a pool/block of IPs in a particular range that have a defined meaning/mapping. For example, any unique destination IP address assigned in 100.4.x.x range could mean 'member of finance group'. From this, a network device can know, a priori, that any traffic destined for 100.4.x.x is from a 'finance' user and apply micro-segmentation or other policies to the traffic associated with a 'finance' user. In some examples, an enforcement device 130 can ascertain that 100.4.5.6 is 'kit' from 'finance' by obtaining the unique-destination-IP-to-metadata mapping information. A network component 128 may be an in-network NAT component 132, which may be the enforcement device 130, and may map back to the original/actual destination IP address near to the destination point (e.g., server 134) in the application network 104 (and the NAT component 132 may optionally run on an enforcement device 130 as well). The metadata context contains the uniquely-assigned-IP-address to original-destination-IP-address in it, as noted earlier.

In some examples, the headend 112 may be an IP termination device, such as a VPN termination headend 112. In such instances, the VPN headend 112 may assign and NAT the original-destination-IP-address to the uniquely-assigned-destination-IP-address. Thus, packets intended for the original-destination-IP-address go to the uniquely-assigned-destination-IP-address using this NAT function. Similar to the proxy headend 112 example, the context data 120 is also collected, and metadata is stored that is mapped to the uniquely-assigned-destination-IP-address. This data 120 also contains a mapping from the uniquely-assigned-destination-IP-address to the original-destination-IP-address similar to the proxy technique described above. After this point, the VPN headend 112 techniques are similar to those described with respect to the proxy headend 112 example above.

Generally, the application network 104 may include devices houses or located inside one or more data centers that may be located at different physical locations. For instance, the application network 104 may be supported by networks of devices in a public cloud computing platform, a private/enterprise computing platform, and/or any combination thereof. The one or more data centers may be physical facilities or buildings located across geographic areas that designated to store networked devices that are part of the application network 104. The data centers may include various networking devices, as well as redundant or backup components and infrastructure for power supply, data communications connections, environmental controls, and various security devices. In some examples, the data centers may include one or more virtual data centers which are a pool or collection of cloud infrastructure resources specifically designed for enterprise needs, and/or for cloud-based service provider needs. Generally, the data centers (physical and/or virtual) may provide basic resources such as processor (CPU), memory (RAM), storage (disk), and networking (bandwidth). However, in some examples the devices in the application network 104 may not be located in explicitly defined data centers, but may be located in other locations or buildings.

The application network 104 may be accessible to client devices 106 over one or more networks 108, such as the Internet. The application network 104, and the networks 108, may each respectively include one or more networks implemented by any viable communication technology, such as wired and/or wireless modalities and/or technologies. The application network 104 and networks 108 may each may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The application network 104 may include devices, virtual resources, or other nodes that relay packets from one network segment to another by nodes in the computer network.

In some examples, the application network 104 may provide, host, or otherwise support one or more applications 136 for client devices 106 to connect to and use. The client devices 106 may comprise any type of device configured to communicate using various communication protocols (e.g., MPTCP, QUIC, and/or any other protocol) over the networks 108. For instance, the client device 106 may comprise personal user device (e.g., desktop computers, laptop computers, phones, tablets, wearable devices, entertainment devices such as televisions, etc.), network devices (e.g., servers, routers, switches, access points, etc.), and/or any other type of computing device.

The applications 136 may be distributed applications such that groups of servers 134 are configured to scale up or down to support instances of an application 136 to service client requests based on demand from the client devices 106. In some examples, the physical servers 134 may each have their own physical IP (PIP) address through which they are reachable, but a client device need only know the virtual IP (VIP) address for the application service as a whole in order to access an instance of an application 136 hosted on the servers 134. In this way, client devices 106 need only know a single VIP to access an application service, and the request to use the application service will be routed to one of the hosted applications 136 on one of the severs 134.

Figure 2:
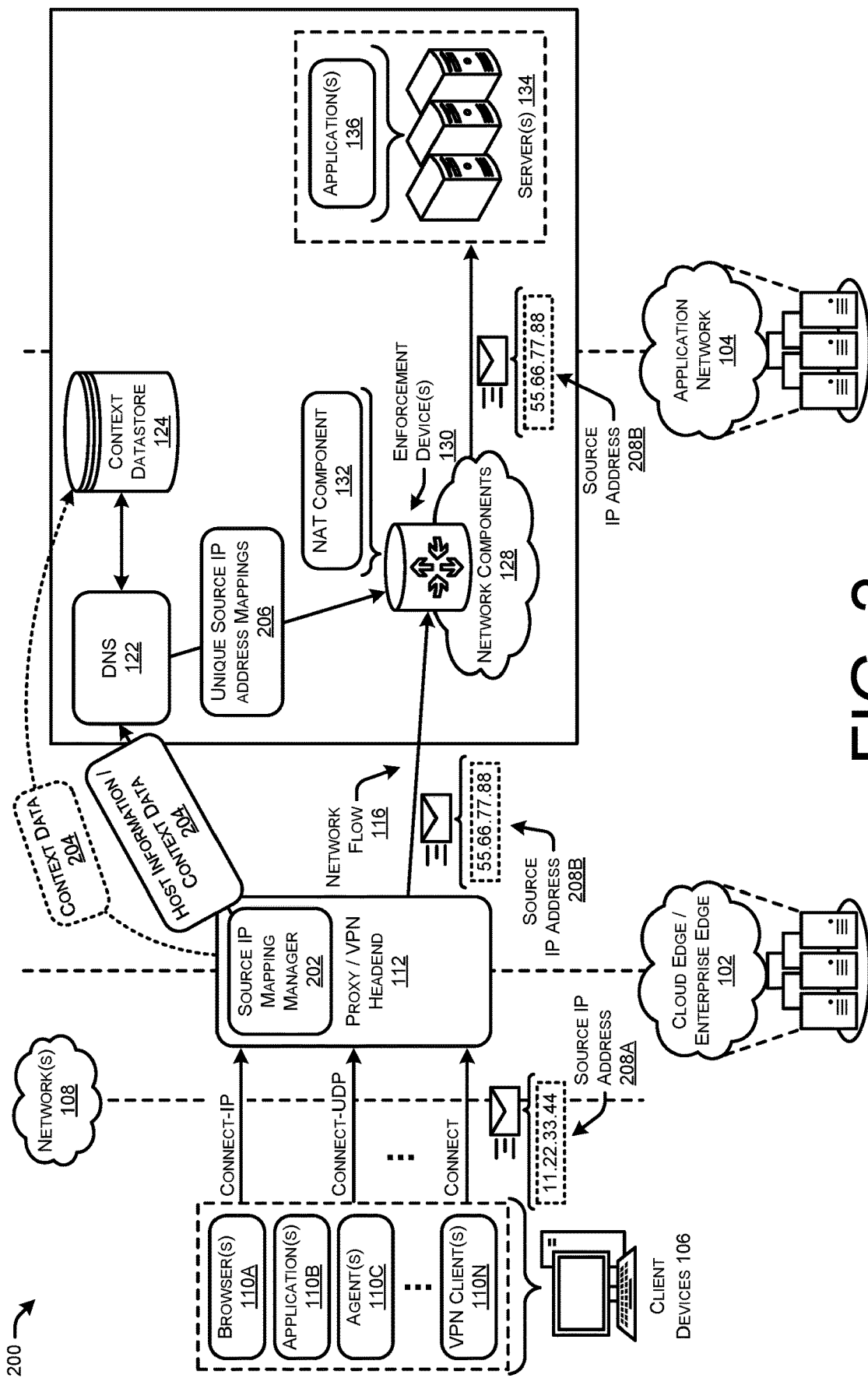
FIG. 2 illustrates a system-architecture diagram in which a unique source IP address of a source device is mapped to a network flow such that an enforcement device in a network can apply policy without having to introspect the network flow.

FIG. 2 illustrates a system-architecture diagram in which a unique source IP address of a source device is mapped to a network flow such that an enforcement device in a network can apply policy without having to introspect the network flow.

The techniques of FIG. 2 are similar to those of FIG. 1, but rather than mapping unique-destination-IP-addresses to flows, the techniques of FIG. 2 include mapping unique-source-IP-addresses to flows. As noted above, a termination device at the edge 102 may be a proxy headend 112. As described above, the proxy headend 112 may demultiplex any multiplexed streams into unique streams per destination as described above. Further, the proxy headend 112 may use uniquely-assigned-source-IP-addresses for the source of the connections and connects to the original-destination-IP-address as intended (after demultiplexing if needed). Further, the context data 204 is stored in the context datastore 124 and associated with, or mapped to, each of the unique-source-IP-addresses for the unique streams. The DNS system 122 may then provide the unique-source-IP-address mappings 306 to the enforcement device(s) 130. The enforcement device(s) 130 use the uniquely-assigned-source-IP-address as the unique identifier to map that back to the policy treatment to be performed on the packet/flow In examples where the termination device is an IP termination device like a VPN terminator, the steps are similar to those described above except that the uniquely-assigned-source-IP-address is used in place of the uniquely-assigned-destination-IP-address in the NAT method described throughout FIG. 1.

Thus, as described in FIGS. 1 and 2, uniquely-assigned-destination-IP-addresses may be mapped to flows, uniquely-assigned-source-IP-addresses may be mapped to flows, and/or a combination thereof.

Figure 3:
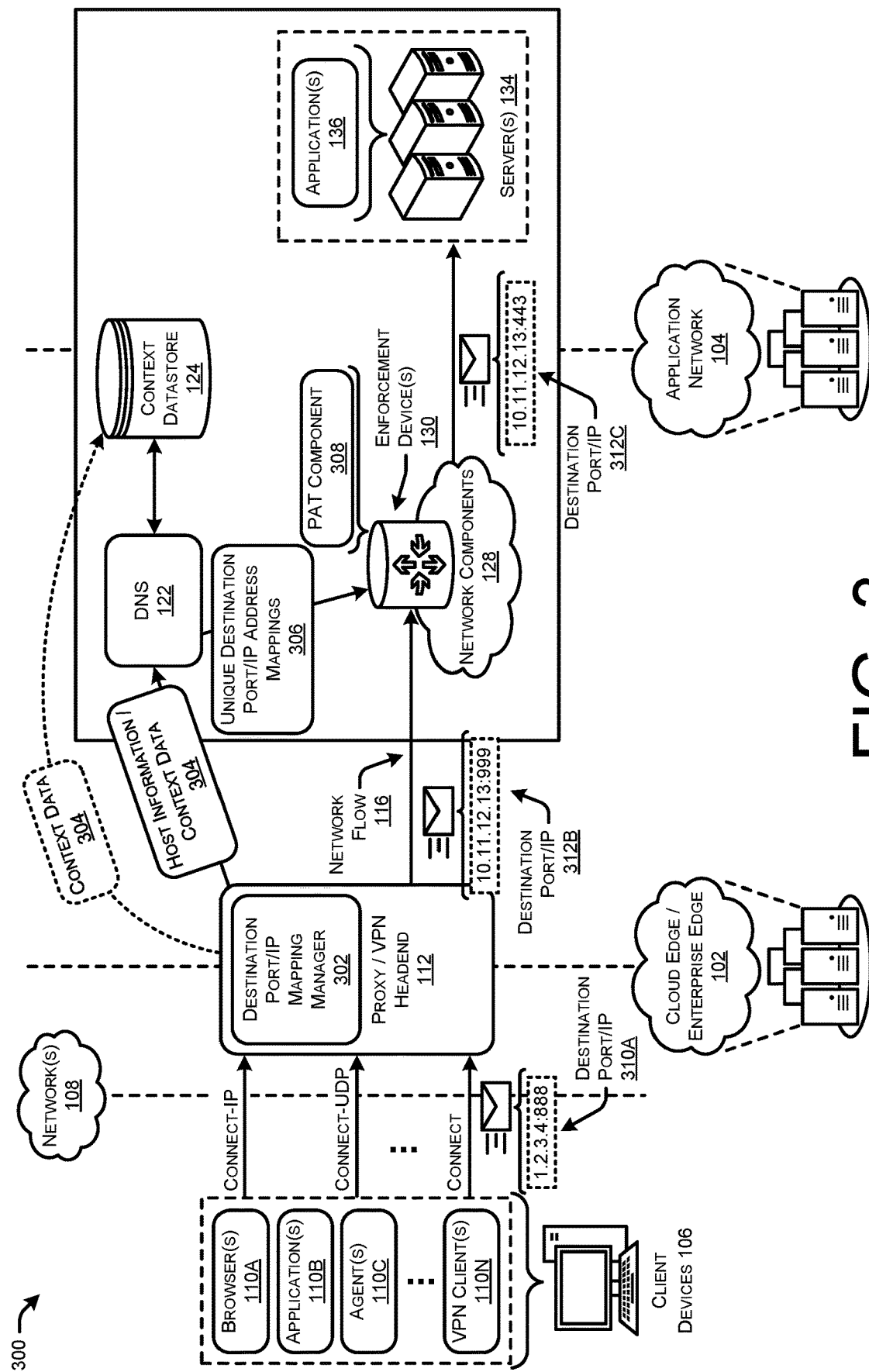
FIG. 3 illustrates a system-architecture diagram in which a destination IP address and unique destination port number of a source device is mapped to a network flow such that an enforcement device in a network can apply policy without having to introspect the network flow.

FIG. 3 illustrates a system-architecture diagram 300 in which a destination IP address and unique destination port number of a source device is mapped to a network flow such that an enforcement device in a network can apply policy without having to introspect the network flow.

As described above with respect to FIGS. 1 and 2, an originating stream is sent from the client device 106 and terminated at the edge device, or the proxy/VPN headend 112. In examples where the terminator is a proxy headend 112, the proxy terminates inner (higher-level) protocols (HTTP/1, HTTP/2, HTTP/3. Further, the proxy headend 112 separates any multiplexed streams inside of the protocol into unique streams. The HOST Header is introspected by the proxy headend 112, for each stream if originally multiplexed, and a normal DNS query is performed on each stream. Additionally, the proxy headend 112 collects context data 304 (e.g., user identity, device information, and/or any other metadata that might be useful for policy enforcement, etc.). That context data 304 and the host information 304 is shared between the edge 102 and DNS systems 122 (e.g. such as mapping a user to a flow). The DNS system 122 then returns the intended destination IP address (e.g., normal DNS behavior) for each stream and the solution stores any contextual mapping of destination-IP-address-to-metadata that was obtained. Additionally, a uniquely-assigned-destination-port is used by the proxy headend 112 and shared with the DNS system (or the component storing the context data 304) in the context data store.

The proxy headend 112 then uses the uniquely-assigned-destination-port to establish a connection to the intended destination, such as the application 136 running on the server 134. Additionally, it should be noted that the originally multiplex streams are turned into multiple unicast streams with respective uniquely-assigned-destination-ports per stream. The context data 304 (metadata) contains a mapping from the uniquely-assigned-destination-port to the intended original-destination-IP-address and original-destination-port. Policies can be crafted such that an enforcement device 130 does not need to do a lookup on every IP/port value. For example, ports can be assigned from a range of ports for a given destination IP address that have a defined meaning/mapping. For example, any port assigned in 4xxx range for IP 100.4.5.6 could mean 'member of finance group.' From this, an enforcement device 130 can know, a priori, that any traffic destined for 100.4.5.6 in the port 4xxx range is from a 'finance' user and apply micro-segmentation or other policies to the traffic associated with a 'finance' user. In some examples, any network device can ascertain that 100.4.5.6:4001 is 'kit' from 'finance' by obtaining the IP-and-port-to-metadata mapping information. A PAT component 308 near the final destination (potentially on the enforcement device(s) 130) is used to map back to the original port. The context data 304 contains the uniquely-assigned-destination-port to original-destination-IP-address original-destination-IP-port in it, as noted earlier. This PAT step is needed to go from uniquely-assigned-destination-port back to original-destination-port.

In examples where the terminator device is an IP address termination device, like a VPN headend 112, the VPN headend 112 generates a uniquely-assigned-destination-port and PATs the original-destination-IP-address and original-destination-port to the uniquely-assigned-destination-port (leaving the destination-IP-address unchanged). Similar to the proxy headend 112 scenario, context data 304 is collected by the VPN headend 112 and the context data 304 is stored and mapped to the uniquely-assigned-destination-port. This context data 304 also contains a mapping from the uniquely-assigned-destination-port to the original-destination-IP-address and originally-assigned-destination-port similar to the proxy technique described earlier. From this state, the techniques performed by the VPN headend 112 are similar to those described above with respect to the proxy headend 112. Note that the in-network PAT component 308 is used to reverse the operation above. This PAT component 308 may be close to the destination so that packets in between have the PAT-treated values to allow policy enforcement to occur on packets in the application network 104 between the source and destination.

Figure 4:
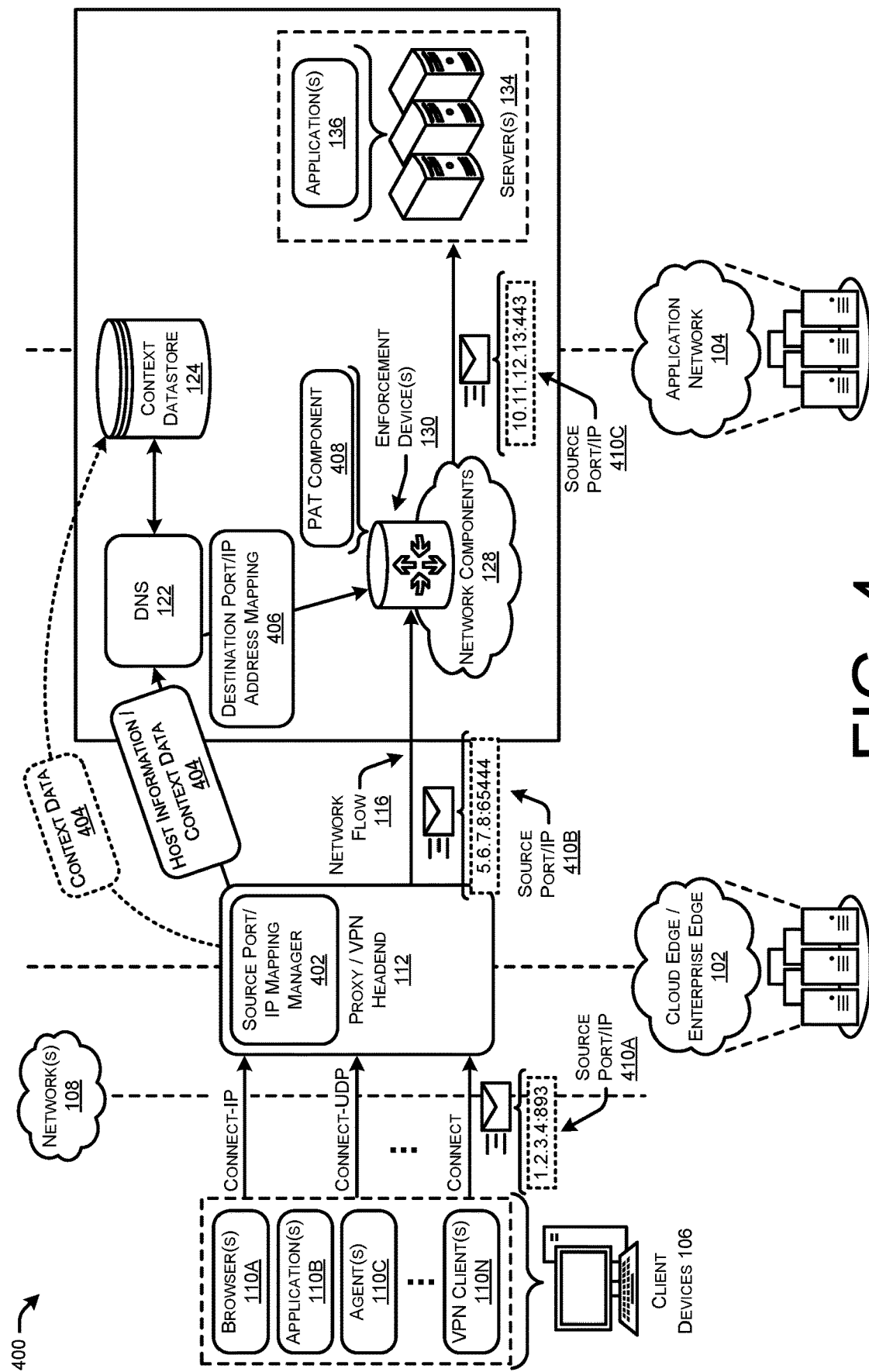
FIG. 4 illustrates a system-architecture diagram in which a source IP address and unique source port number of a source device is mapped to a network flow such that an enforcement device in a network can apply policy without having to introspect the network flow.

FIG. 4 illustrates a system-architecture diagram in which a source IP address and unique source port number of a source device is mapped to a network flow such that an enforcement device in a network can apply policy without having to introspect the network flow. Similar to the techniques described above, the proxy headend 112 may demultiplex any multiplexed streams into unique streams per destination like described above. The proxy headend 112 uses a uniquely-assigned-source-port for the source of the connection and connects to the original-destination-IP-address and original-destination-port as intended (after demultiplexing if needed). The context data 404 associated with each unique streams is stored, and the uniquely-assigned-source-port is used instead of the uniquely-assigned-destination-port as described above. In this example, the enforcement device(s) 130 may use the combination of uniquely-assigned-source-port and original-source-IP-address as the unique identifier to map that back to the policy treatment to be performed on the packet/flow. In examples where the terminator device is an IP termination device, like a VPN headend 112, the process is the same as above except that the uniquely-assigned-source-port is used in place of the uniquely-assigned-destination-port described throughout the above example.

Figure 5:
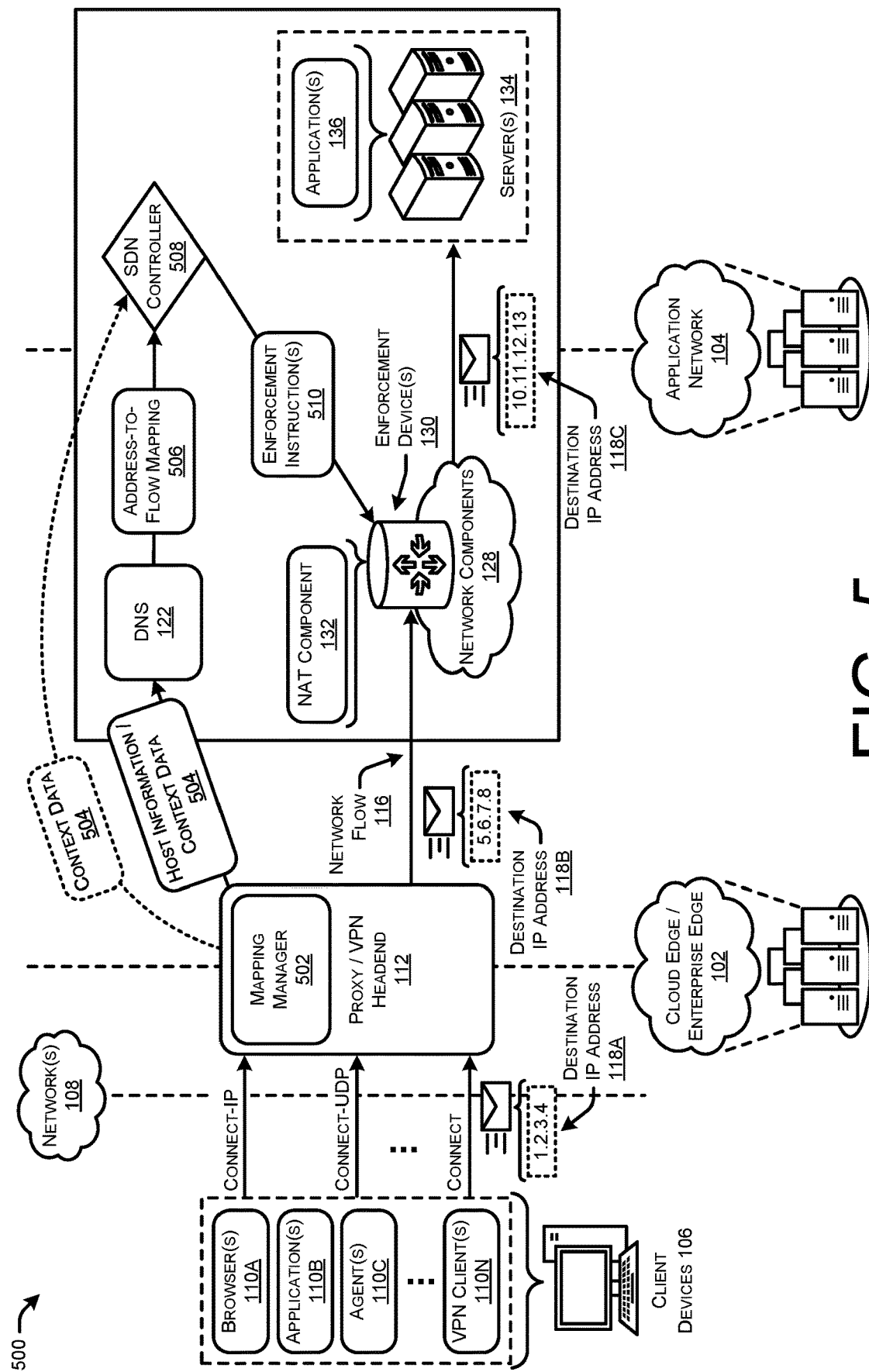
FIG. 5 illustrates a system-architecture diagram in which a Software Defined Networking (SDN) controller receives a mapping between a unique address/port and a network flow, and programs one or more network devices to enforce flow-specific policy at one or more places in a network.

FIG. 5 illustrates a system-architecture diagram in which a Software Defined Networking (SDN) controller receives a mapping between a unique address/port and a network flow, and programs one or more network devices to enforce flow-specific policy at one or more places in a network. Generally, the SDN controller 508 may be any type of controller 508 configured to control at least portions of various types of networks.

Generally, any of the techniques described above may be used with respect to FIG. 5 for mapping context data and unique information to flows. That is, the techniques described in FIG. 5 may be implemented using mappings between flows and one or more of unique-destination-IP-addresses, unique-source-IP-addresses, unique-destination-port-numbers, unique-source-port-numbers, etc.

Once the flow has been mapped to either destination IP/port or source IP/Port as described above, the address-to-flow mappings 506 may be provided to an SDN controller 508. The SDN controller 508 may then program network components 128 to apply policies as defined by the admin at various places in the application network 104. In some instances, programming the network components 128 (e.g., enforcement devices 130) with the enforcement instructions 510 may include applying ACLs on switches or Smart NICs, re-routing traffic to IDS/IPS systems, blocking connections, and isolating traffic into a specific virtual overlay network.

In a specific example, the headend 112 may have worked with the DNS system 122 as described above to map a flow (e.g., user) into a QUIC flow at the DNS layer, and assigned a backend IP address for use. At the point of assigning the unique IP address (or unique port), the DNS system 122 will notify the SDN controller 508 about the flow-to-IP mapping (in this case, it maps to 5.6.7.8 on the backend of the proxy). The SDN controller 508 may receive or determine the policy for the flow, and the SDN controller will notify the NAT/enforcement device 130 about this policy and/or decision. The client device 106 may send data over QUIC and to the application 136, the proxy will proxy this traffic into a source address of 5.6.7.8 on the backend. The traffic will go through a NAT/enforcement device 130 and the enforcement device 130 will apply policy based on the enforcement instructions 510 received from the SDN controller 508.

In some instances, the enforcement device 130 may simply block traffic if the enforcement instructions 510 indicate that the particular traffic is to be blocked. In addition to blocking traffic, the enforcement device 130 may perform other types of operators. For instance, the enforcement device 130 may be programmed by the SDN controller 508 selectively send traffic through an inspection node. For instance, if we would like to apply policy by acting as a "man in the middle" and doing deep packet inspection (DPI), the enforcement device 130 may redirect a flow to a QUIC-capable DPI engine that can analyze the flow/traffic. As another example, the enforcement device 130 may apply policy by redirecting traffic into a different data center. This would allow for traffic to be ingested using AnyCast, and the enforcement device 130 may redirect a QUIC flow to a country-based data center for actual application processing. As a specific example, a user from the United Kingdom may be in the United States, and AnyCast directs the user into a United States data center. The enforcement device 130 may redirect that flow into a backend node in the United Kingdom for compliance reasons. As an even further example, the enforcement device 130 may send the traffic through a stateful firewall based on policy. Similar to the DPI case, the enforcement device 130 could send the traffic to a set of firewall nodes to additional policy to be applied. Although the examples above are described as being performed by an enforcement device 130 that may also have the NAT component 132, the enforcement and/or NAT may performed on various placed in the application network 104, such as on routers, switches, smartNICs running on hosts, virtual switches running inside of hosts, Kubernetes control plane, and so forth.

As described herein, and as illustrated, the proxy/VPN headends 112 may additionally, or alternatively, provide the context data 120/204/304/404/504 directly to the data store 124 and/or SND controller 508. That is, the context data 120/204/304/404/504 may not be send to the DNS 122 directly, and may instead be sent to, or stored in, the data store 124.

FIGS. 6-9 illustrate flow diagrams of example methods 600, 700, 800, and 900 that illustrate aspects of the functions performed at least partly by the devices in the distributed application architecture as described in FIGS. 1-5. The logical operations described herein with respect to FIGS. 6-9 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 6-9 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, and/or different arrangements of components.

Figure 6:
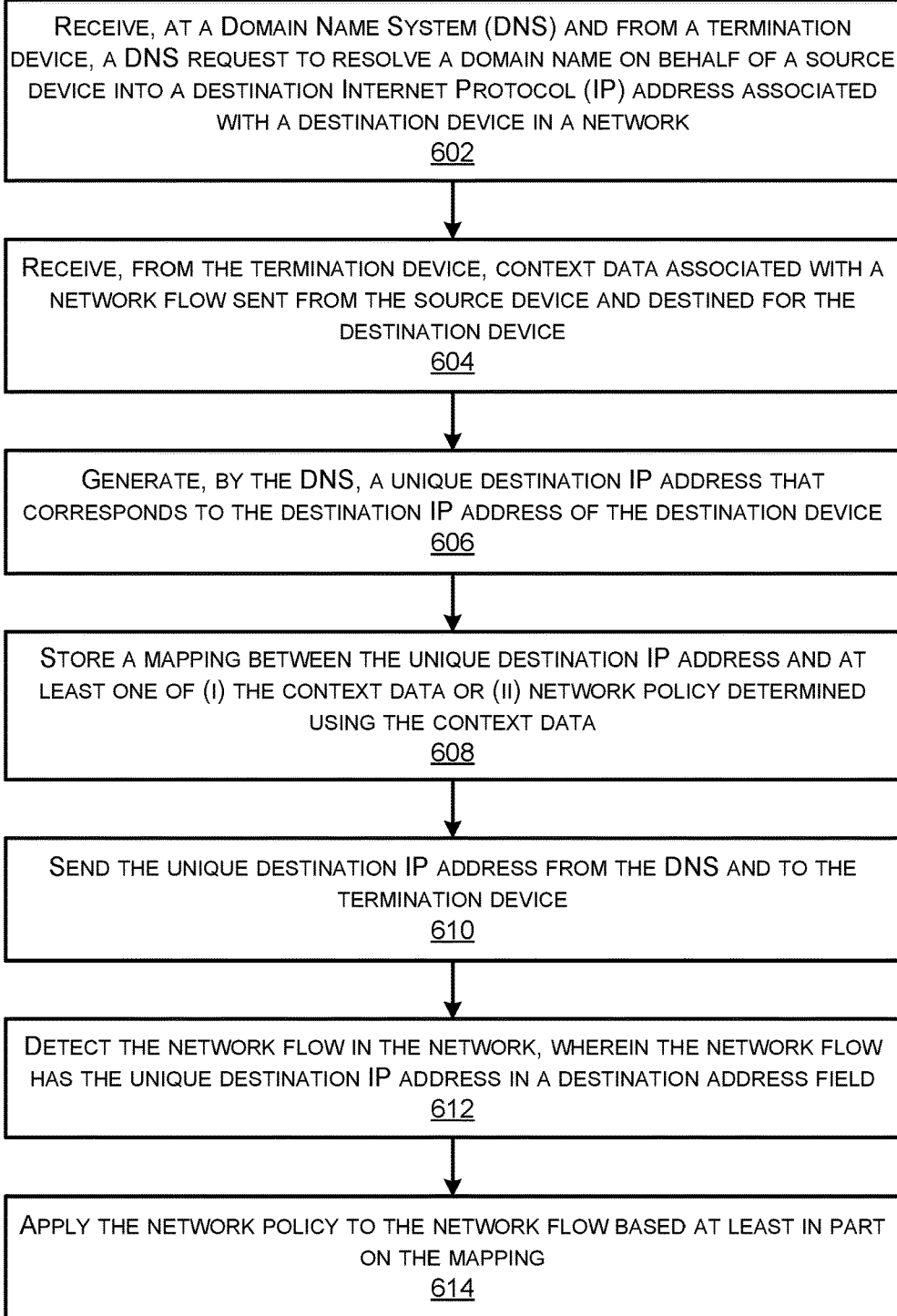
FIG. 6 illustrates a flow diagram of an example method for a DNS system to map a unique destination IP address to a network flow such that an enforcement device in a network can apply policy without having to introspect the network flow.

FIG. 6 illustrates a flow diagram of an example method 600 for a DNS system to map a unique destination IP address to a network flow such that an enforcement device in a network can apply policy without having to introspect the network flow.

At 602, a Domain Name System (DNS) may receive, from a termination device, a DNS request to resolve a domain name on behalf of a source device into a destination Internet Protocol (IP) address associated with a destination device in a network. For instance, the DNS 122 may receive, from a proxy/VPN headend 112, a DNS request to resolve a domain name on behalf of a client device 106 and into a destination IP address associated with an application 136 and/or a server 134.

At 604, the DNS may receive, from the termination device, context data associated with a network flow sent from the source device and destined for the destination device. For instance, the DNS 122 may receive header/context data 120 from the proxy/VPN headend 112. In some instances, the context data 120 may include an indication of at least one of an application running on the source device that initiated the network flow, a service associated with the destination device to which the network flow is being transmitted, a user identity of a user of the source device, and/or other data associated with the flow.

At 606, the DNS may generate, by the DNS, a unique destination IP address that corresponds to the destination IP address of the destination device. For instance, the DNS 112 may generate a unique destination IP address for the network flow that is different than the actual destination IP address of the destination device (e.g., server 132, application 136, etc.).

At 608, the DNS may store a mapping between the unique destination IP address and at least one of (i) the context data or (ii) network policy determined using the context data. For instance, the DNS 122 may store a mapping between the unique destination IP address and one of context data or network policy in a context datastore 124.

At 610, the DNS may send the unique destination IP address from the DNS and to the termination device. For instance, the DNS 122 may send a DNS response to the proxy/VPN headend 112 that includes the unique destination IP address for the network flow. In some instances, the proxy/VPN headend 112 may send multiple DNS responses with different unique destination IP addresses for the proxy-VPN headend 112 to use for different network flows that were demultiplexed from the encrypted stream sent from the client device 106.

At 612, a network component may detect the network flow in the network, wherein the network flow has the unique destination IP address in a destination address field. As an example, the enforcement device 130 may detect, in a header of the network flow, the unique destination IP address. At 614, the network component may apply the network policy to the network flow based at least in part on the mapping.

In some instances, the method 600 may further include performing network address translation (NAT) to translate the unique destination IP address to the destination IP address of the destination device, and swapping the unique destination IP address with the destination IP address in the destination address of the network flow.

Figure 7:
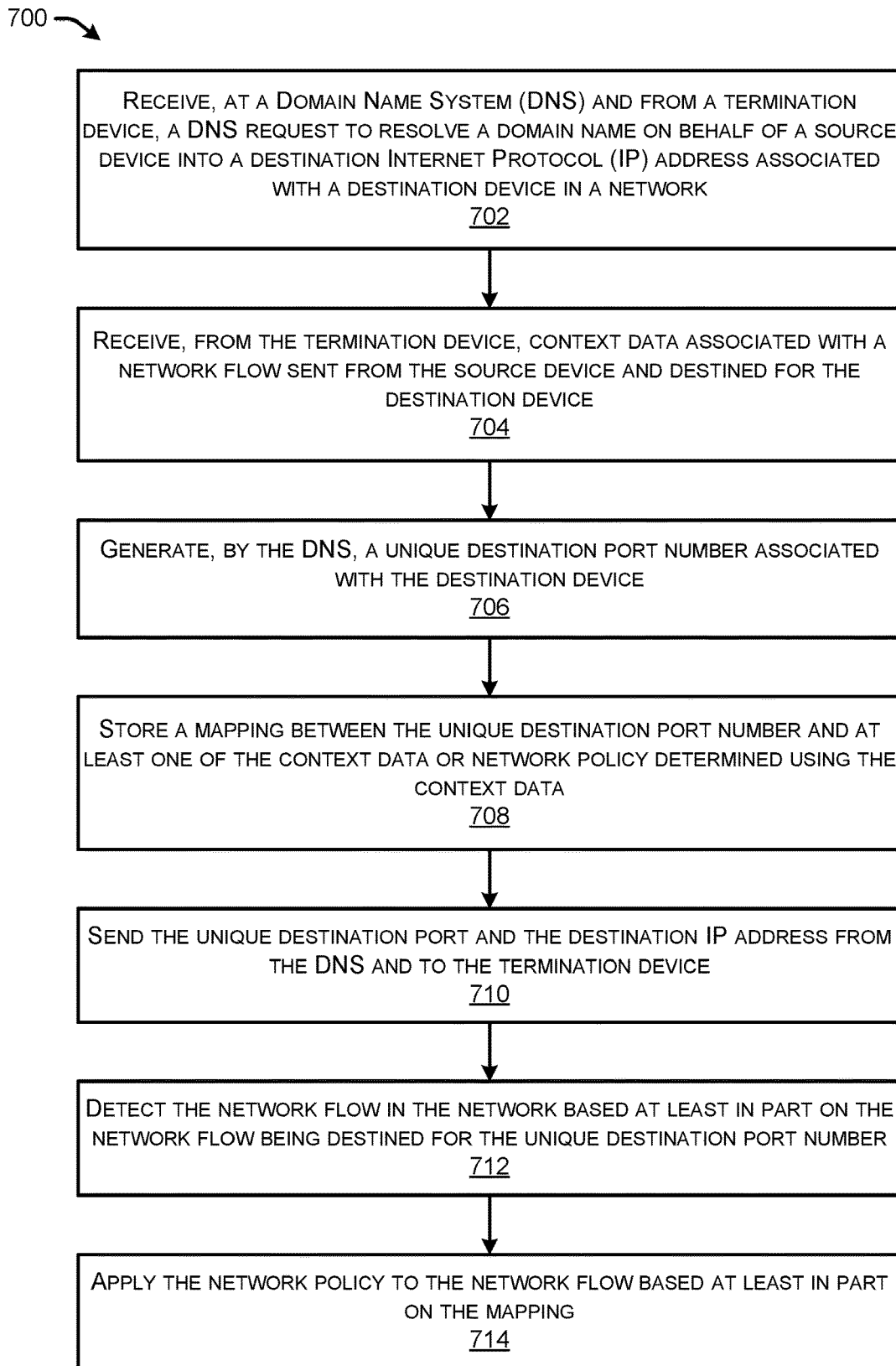
FIG. 7 illustrates a flow diagram of an example method for a DNS system to map a unique destination port number to a network flow such that an enforcement device in a network can apply policy without having to introspect the network flow.

FIG. 7 illustrates a flow diagram of an example method 700 for a DNS to map a unique destination port number to a network flow such that an enforcement device in a network can apply policy without having to introspect the network flow.

At 702, a Domain Name System (DNS) may receive, from a termination device, a DNS request to resolve a domain name on behalf of a source device into a destination Internet Protocol (IP) address associated with a destination device in a network. For instance, the DNS 122 may receive, from a proxy/VPN headend 112, a DNS request to resolve a domain name on behalf of a client device 106 and into a destination IP address associated with an application 136 and/or a server 134.

At 704, the DNS may receive, from the termination device, context data associated with a network flow sent from the source device and destined for the destination device. For instance, the DNS 122 may receive header/context data 120 from the proxy/VPN headend 112. In some instances, the context data 120 may include an indication of at least one of an application running on the source device that initiated the network flow, a service associated with the destination device to which the network flow is being transmitted, a user identity of a user of the source device, and/or other data associated with the flow.

At 706, the DNS may generate, by the DNS, a unique destination port number associated with the destination device. For instance, the DNS 112 may generate a unique destination port number for the network flow that is different than the actual destination port number of the destination device (e.g., server 132, application 136, etc.).

At 708, the DNS may store a mapping between the unique destination port number and at least one of (i) the context data or (ii) network policy determined using the context data. For instance, the DNS 122 may store a mapping between the unique destination port number and one of context data or network policy in a context datastore 124.

At 710, the DNS may send the unique destination port number and the destination IP address from the DNS and to the termination device. For instance, the DNS 122 may send a DNS response to the proxy/VPN headend 112 that includes the unique destination port number for the network flow. In some instances, the proxy/VPN headend 112 may send multiple DNS responses with different unique destination port numbers for the proxy-VPN headend 112 to use for different network flows that were demultiplexed from the encrypted stream sent from the client device 106

At 712, a network component may detect the network flow in the network based at least in part on the network flow being destined for the unique destination port number. As an example, the enforcement device 130 may detect, in a header of the network flow, the unique destination port number. At 714, the DNS may apply the network policy to the network flow based at least in part on the mapping.

Figure 8:
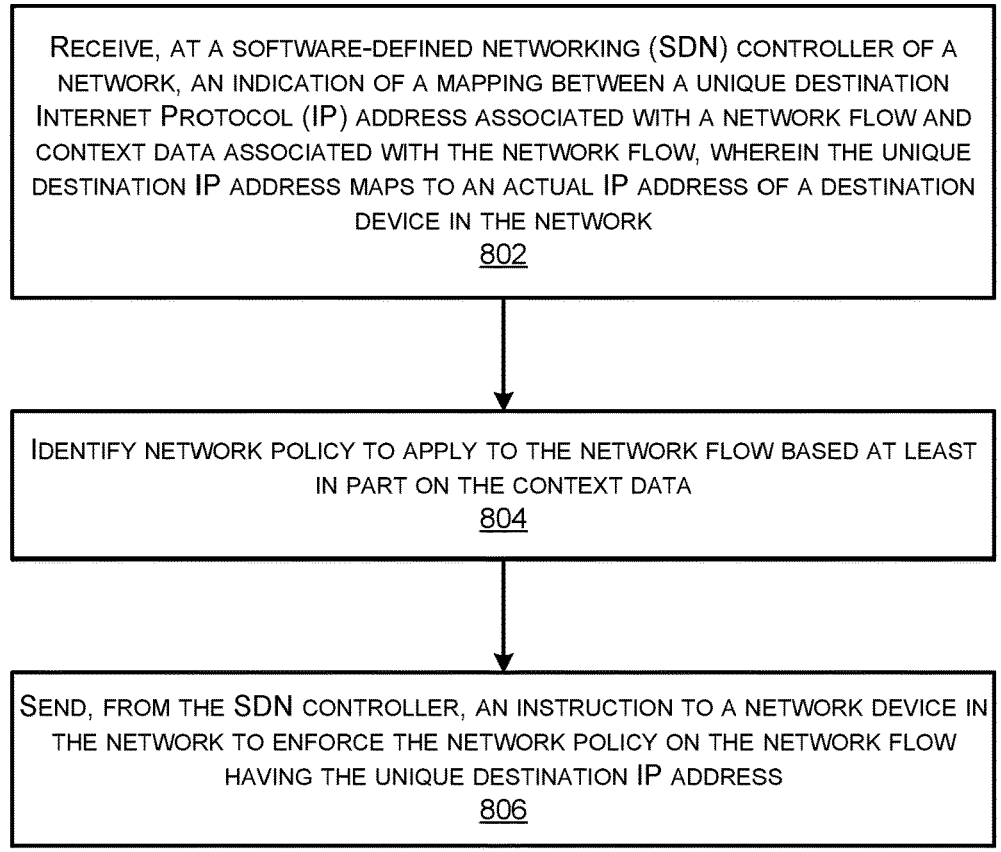
FIG. 8 illustrates a flow diagram of an example method for an SDN controller to program an enforcement network device in a network to apply policy to a network flow having a unique destination IP address.

FIG. 8 illustrates a flow diagram of an example method 800 for an SDN controller to program an enforcement network device in a network to apply policy to a network flow having a unique destination IP address.

At 802, a software-defined networking (SDN) controller of a network may receive an indication of a mapping between a unique destination Internet Protocol (IP) address associated with a network flow and context data associated with the network flow. In some instances, the unique destination IP address maps to an actual IP address of a destination device in the network. For instance, the SDN controller 508 may receive an indication of a mapping that was created by the DNS 122.

At 804, the SDN controller may identify network policy to apply to the network flow based at least in part on the context data. For instance, and administrator of the application network 104 may define network policy that is to be applied to the network flow based on context data, such as user identity determined using authentication, and application initiating the connection, an application to which the traffic is destined, and/or any other context data that may be used to apply policy.

At 806, the SDN controller may send an instruction to a network device in the network to enforce the network policy on the network flow having the unique destination IP address.

FIG. 9 illustrates a flow diagram of an example method 900 for an SDN controller to program an enforcement network device in a network to apply policy to a network flow having a unique destination port number.

At 902, a software-defined networking (SDN) controller of a network may receive an indication of a mapping between a unique destination port number associated with a network flow and context data associated with the network flow. In some instances, the unique destination port number maps to an actual destination port number of a destination device in the network. For instance, the SDN controller 508 may receive an indication of a mapping that was created by the DNS 122.

At 904, the SDN controller may identify network policy to apply to the network flow based at least in part on the context data. For instance, and administrator of the application network 104 may define network policy that is to be applied to the network flow based on context data, such as user identity determined using authentication, and application initiating the connection, an application to which the traffic is destined, and/or any other context data that may be used to apply policy.

At 806, the SDN controller may send an instruction to a network device in the network to enforce the network policy on the network flow having the unique destination port number. In some instances, the SDN controller 508 may send enforcement instructions 510 that program the enforcement device 130 to enforce policy based on the unique destination port number. The enforcement instructions 510 may be any type of code or data usable by the enforcement device 130 to apply policy.

Figure 10:
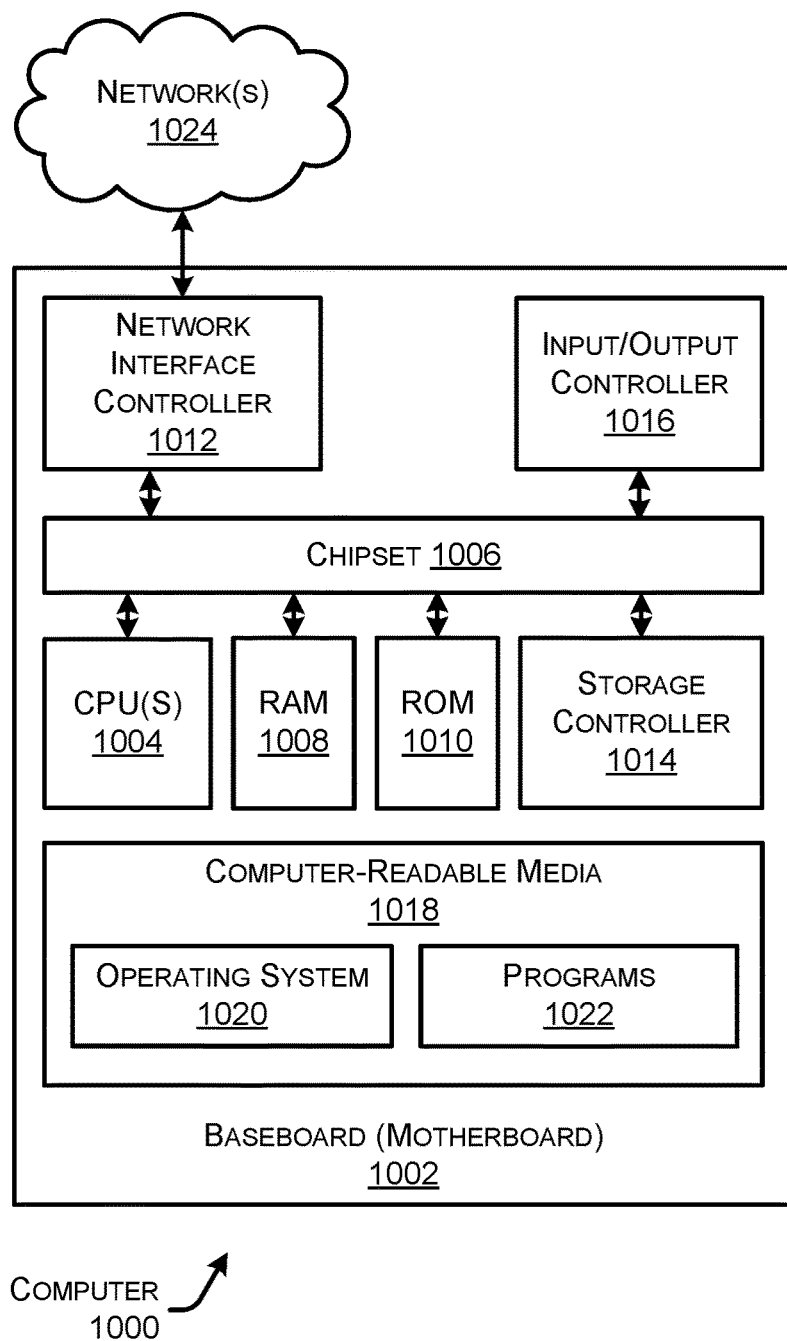
FIG. 10 is a computer architecture diagram showing an illustrative computer hardware architecture for implementing a computing device that can be utilized to implement aspects of the various technologies presented herein.

FIG. 10 shows an example computer architecture for a computer 100 capable of executing program components for implementing any of the functionality described above. The computer architecture shown in FIG. 10 illustrates a conventional server computer, workstation, desktop computer, laptop, tablet, network appliance, e-reader, smartphone, or other computing device, and can be utilized to execute any of the software components presented herein. The computer 100 may, in some examples, correspond to a physical server described herein, and may comprise networked devices such as servers, switches, routers, hubs, bridges, gateways, modems, repeaters, access points, etc. In other examples, the computer 1000 may be the proxy/VPN headend 112, the enforcement device(s) 130, at least part of the DNS 122, at least part of the SDN controller 508, and/or any other device or included in any system described herein. That is, the computer 1000 may be any device described herein, or included in any system, and be configured to perform any of the operations described herein.

The computer 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM can also store other software components necessary for the operation of the computer 1000 in accordance with the configurations described herein.

The computer 1000 can operate in a networked environment using logical connections to remote computing devices and computer systems through a network, such as the network 1024. The chipset 1006 can include functionality for providing network connectivity through a NIC 1012, such as a gigabit Ethernet adapter. The NIC 1012 is capable of connecting the computer 1000 to other computing devices over the network 1024 (and/or 108). It should be appreciated that multiple NICs 1012 can be present in the computer 1000, connecting the computer to other types of networks and remote computer systems.

The computer 1000 can be connected to a storage device 1018 that provides non-volatile storage for the computer. The storage device 1018 can store an operating system 1020, programs 1022, and data, which have been described in greater detail herein. The storage device 1018 can be connected to the computer 1000 through a storage controller 1014 connected to the chipset 1006. The storage device 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 can store data on the storage device 1018 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1018 is characterized as primary or secondary storage, and the like.

For example, the computer 1000 can store information to the storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the storage device 1018 by detecting the physical states or characteristics of one or more particular locations within the physical storage units.

In addition to the mass storage device 1018 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000. In some examples, the operations performed by the proxy/VPN headend 112, the enforcement device(s) 130, at least part of the DNS 122, at least part of the SDN controller 508, and/or any other device or included in any system described herein, and or any components included therein, may be supported by one or more devices similar to computer 1000. Stated otherwise, some or all of the operations performed by the proxy/VPN headend 112, the enforcement device(s) 130, at least part of the DNS 122, at least part of the SDN controller 508, and/or any other device or included in any system described herein, and or any components included therein, may be performed by one or more computer devices 1000 operating in a system arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1018 can store an operating system 1020 utilized to control the operation of the computer 1000. According to one embodiment, the operating system comprises the LINUX operating system. According to another embodiment, the operating system comprises the WINDOWS® SERVER operating system from MICROSOFT Corporation of Redmond, Washington According to further embodiments, the operating system can comprise the UNIX operating system or one of its variants. It should be appreciated that other operating systems can also be utilized. The storage device 1018 can store other system or application programs and data utilized by the computer 1000.

In one embodiment, the storage device 1018 or other computer-readable storage media is encoded with computer-executable instructions which, when loaded into the computer 1000, transform the computer from a general-purpose computing system into a special-purpose computer capable of implementing the embodiments described herein. These computer-executable instructions transform the computer 1000 by specifying how the CPUs 1004 transition between states, as described above. According to one embodiment, the computer 1000 has access to computer-readable storage media storing computer-executable instructions which, when executed by the computer 1000, perform the various processes described above with regard to FIGS. 1-9. The computer 1000 can also include computer-readable storage media having instructions stored thereupon for performing any of the other computer-implemented operations described herein.

The computer 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can provide output to a display, such as a computer monitor, a flat-panel display, a digital projector, a printer, or other type of output device. It will be appreciated that the computer 1000 might not include all of the components shown in FIG. 8, can include other components that are not explicitly shown in FIG. 8, or might utilize an architecture completely different than that shown in FIG. 8.

As described herein, the computer 1000 may comprise one or more of the proxy/VPN headend 112, the enforcement device(s) 130, at least part of the DNS 122, at least part of the SDN controller 508, and/or any other device or included in any system described herein. The computer 1000 may include one or more hardware processors 1004 (processors) configured to execute one or more stored instructions. The processor(s) 1004 may comprise one or more cores. Further, the computer 1000 may include one or more network interfaces configured to provide communications between the computer 1000 and other devices, such as the communications described herein as being performed by proxy/VPN headend 112, the enforcement device(s) 130, at least part of the DNS 122, at least part of the SDN controller 508, and/or any other device or included in any system described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 1022 may comprise any type of programs or processes to perform the techniques described in this disclosure for providing a distributed application load-balancing architecture 102 that is capable of supporting multipath transport protocol. That is, the computer 1000 may comprise any one of the proxy/VPN headend 112, the enforcement device(s) 130, at least part of the DNS 122, at least part of the SDN controller 508, and/or any other device or included in any system described herein. The programs 1022 may comprise any type of program that cause the computer 1000 to perform techniques for communicating with other devices using any type of protocol or standard usable for determining connectivity.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
receiving, from a Domain Name Service (DNS) at a software-defined networking (SDN) controller of a network, a first indication of a first mapping between a first unique destination Internet Protocol (IP) address associated with a first network flow and first context data associated with the first network flow, wherein the first unique destination IP address maps to an actual destination IP address of a destination device in the network, and where the first unique destination IP address is different than the actual destination IP address;
receiving, from the DNS and at the SDN controller, a second indication of a second mapping between a second unique destination IP address associated with a second network flow and second context data associated with the second network flow, wherein the second unique destination IP address maps to the actual destination IP address of the destination device, and where the second unique destination IP address is different than the actual destination IP address;
identifying first network policy to apply to the first network flow based at least in part on the first context data;
sending, from the SDN controller, a first instruction to a network device in the network to enforce the first network policy on the first network flow having the first unique destination IP address;
identifying second network policy to apply to the second network flow based at least in part on the second context data, wherein the second network policy is different than the first network policy; and
sending, from the SDN controller, a second instruction to the network device or another network device in the network to enforce the second network policy on the second network flow having the second unique destination IP address.

2. The method of claim 1, further comprising:
receiving, at the network device, the first network policy;
identifying, at the network device, the first network flow based at least in part on the first unique destination IP address being in a destination field of the first network flow; and
enforcing the first network policy on the first network flow.

3. The method of claim 2, further comprising:
performing network address translation (NAT) to translate the first unique destination IP address into the actual destination IP address of the destination device;
swapping the first unique destination IP address with the actual destination IP address in the destination address of the network flow; and
sending the first network flow to the actual destination IP address.

4. The method of claim 1, further comprising:
identifying, from the first context data, a user identity of a user of a source device of the first network flow,
wherein the first network policy is identified based at least in part on the user identity.

5. The method of claim 1, further comprising:
identifying, from the first context data, at least one of:
an application running on a source device that initiated the first network flow; or
a service associated with the destination device to which the first network flow is being transmitted,
wherein the first network policy is identified based at least in part on at least one of the application or the service.

6. The method of claim 1, further comprising:
determining, using the first context data, that the first network flow is to be sent through at least one of an inspection node or a firewall node; and the instruction to enforce the first network policy includes a command for the network device to route the first network flow through at least one of the inspection node or the firewall node.

7. The method of claim 1, further comprising:
determining, based at least in part on the first network policy being enforced, at least one of an optimized device type or at an optimized network location for enforcing the first network policy; and
selecting the network device from amongst a group of network devices based at least in part on the network device being at least one of the optimized device type or at an optimized network location for enforcing the first network policy,
wherein the group of network devices include multiple of:
a network router;
a network switch;
a network smart network interface card (NIC);
a virtual switch running on the destination device; or
a control plane of Kubernetes.

8. A system comprising:
one or more processors; and
one or more non-transitory computer-readable media storing computer-executable instructions that, when executed by the one or more processors, cause the one or more processors to perform operations comprising:
receiving, at a software-defined networking (SDN) controller of a network, an indication of a mapping between a unique destination Internet Protocol (IP) address associated with a network flow and context data associated with the network flow, wherein:
the unique destination IP address maps to an actual destination IP address of a destination device in the network;
the unique destination IP address is different than the actual destination IP address of the destination device; and
the unique destination IP address is generated by a Domain Name Service (DNS);
identifying network policy to apply to the network flow based at least in part on the context data; and
sending, from the SDN controller, an instruction to a network device in the network to enforce the network policy on the network flow having the unique destination IP address.

9. The system of claim 8, the operations further comprising:
receiving, at the network device, the network policy;
identifying, at the network device, the network flow based at least in part on the unique destination IP address being in a destination field of the network flow; and
enforcing the network policy on the network flow.

10. The system of claim 9, the operations further comprising:
performing network address translation (NAT) to translate the unique destination IP address into the actual destination IP address of the destination device;
swapping the unique destination IP address with the actual destination IP address in the destination address of the network flow; and
sending the network flow to the actual destination IP address.

11. The system of claim 8, the operations further comprising:
identifying, from the context data, a user identity of a user of a source device of the network flow,
wherein the network policy is identified based at least in part on the user identity.

12. The system of claim 8, the operations further comprising:
identifying, from the context data, at least one of:
an application running on a source device that initiated the network flow; or
a service associated with the destination device to which the network flow is being transmitted,
wherein the network policy is identified based at least in part on at least one of the application or the service.

13. The system of claim 8, the operations further comprising:
determining, using the context data, that the network flow is to be sent through at least one of an inspection node or a firewall node; and
the instruction to enforce the network policy includes a command for the network device to route the network flow through at least one of the inspection node or the firewall node.

14. The system of claim 8, the operations further comprising:
determining, based at least in part on the network policy being enforced, at least one of an optimized device type or at an optimized network location for enforcing the network policy; and
selecting the network device from amongst a group of network devices based at least in part on the network device being at least one of the optimized device type or at an optimized network location for enforcing the network policy,
wherein the group of network devices include multiple of:
a network router;
a network switch;
a network smart network interface card (NIC);
a virtual switch running on the destination device; or
a control plane of Kubernetes.

* * * * *